United States Patent

[11] 3,601,926

| | | |
|---|---|---|
| [72] | Inventor | Donald P. Weiher<br>Toledo, Ohio |
| [21] | Appl. No. | 842,863 |
| [22] | Filed | July 18, 1969 |
| [45] | Patented | Aug. 31, 1971 |
| [73] | Assignee | Kaiser Jeep Corporation<br>Toledo, Ohio |

[54] SLIDING DOOR AND SUPPORT
7 Claims, 3 Drawing Figs.

[52] U.S. Cl. .................................................. 49/409,
16/88
[51] Int. Cl. ................................................. E05d 13/02
[50] Field of Search .......................................... 49/409,
410, 425; 16/88, 87, 87.8, 86.1

[56] References Cited
UNITED STATES PATENTS

| 1,223,112 | 4/1917 | Rixson | 16/88 X |
| 1,568,270 | 1/1926 | Cross | 16/88 X |
| 1,688,191 | 10/1928 | Kuhn | 16/88 X |
| 3,312,015 | 4/1967 | Plegat | 49/410 X |
| 3,466,698 | 9/1969 | Nystrom | 49/409 X |

*Primary Examiner*—J. Karl Bell
*Attorney*—Harness, Dickey & Pierce

ABSTRACT: A support for a sliding door for an automotive vehicle which support includes a ball and cage for minimizing friction.

PATENTED AUG 31 1971 3,601,926
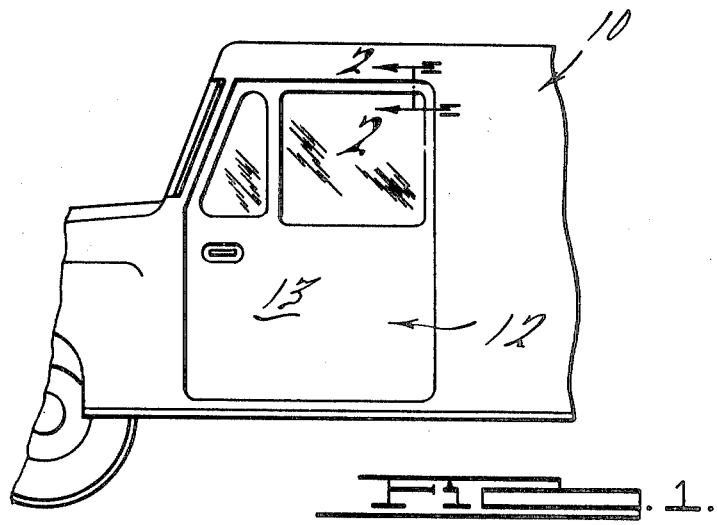
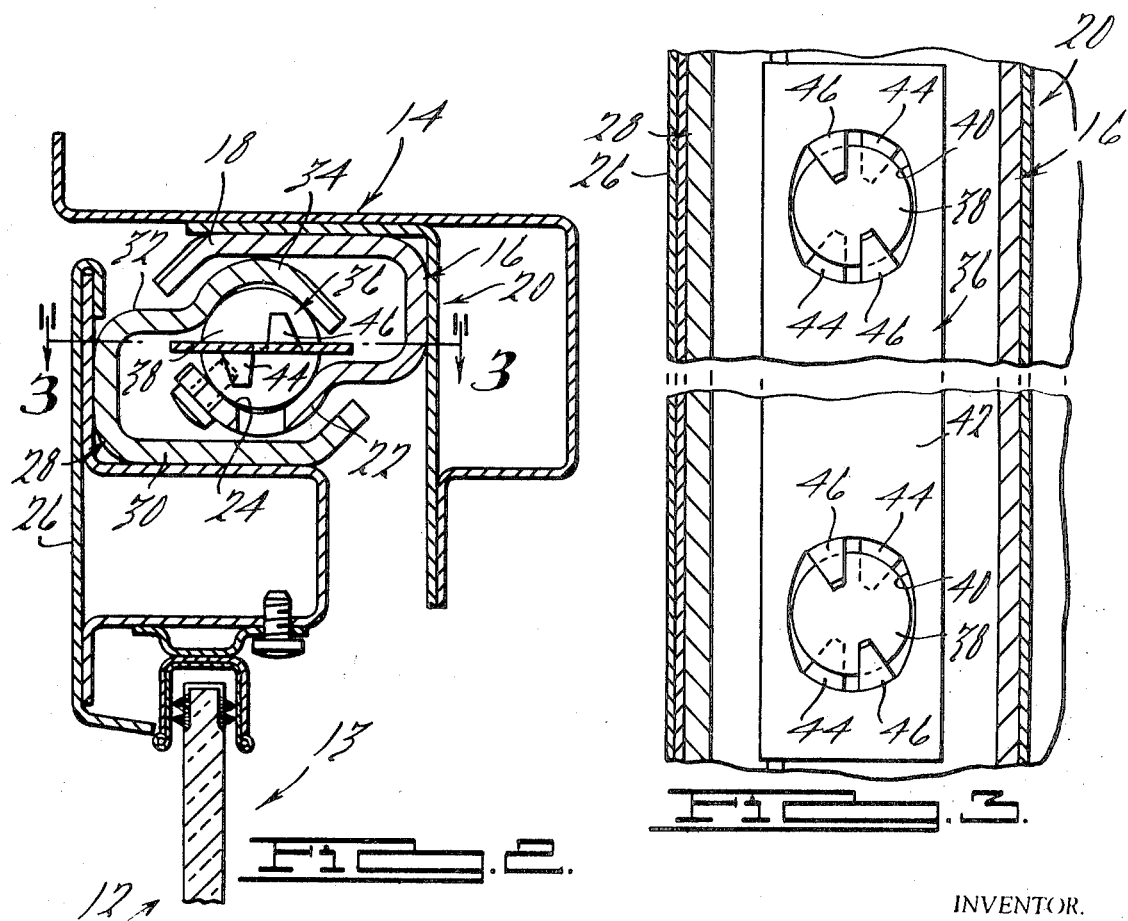
INVENTOR.
Donald P. Weihen
BY
Harness, Dickey-Pierce
ATTORNEYS

3,601,926

SLIDING DOOR AND SUPPORT

SUMMARY BACKGROUND OF THE INVENTION

The present invention relates to a sliding door construction for an automotive vehicle and more particularly to a sliding door construction utilizing a ball bearing support.

For a sliding door for a commercial automotive application, i.e. such as delivery trucks, postal vehicles, etc., it is desirable to provide a sliding door construction which can quickly and easily be opened and closed by the vehicle operator; in addition the sliding support mechanisms must provide a durable construction which minimizes friction and has a long life. In the present invention a novel ball bearing support has been provided which minimizes friction and is durable. Therefore, it is an object of the present invention to provide a new and improved sliding door construction and including a new and improved ball bearing support.

Other objects, features, and advantages of the present invention will become apparent from the subsequent description and the appended claims, taken in conjunction with the accompanying drawings, in which:

FIG. 1 is a side elevational view of a part of an automotive vehicle including a sliding door construction embodying features of the present invention;

FIG. 2 is a sectional view of the assembly of FIG. 1 taken generally along the line 2—2 of FIG. 1; and FIG. 3 is a sectional view of the assembly of FIG. 1 taken generally along the line 3—3 in FIG. 2.

Looking now to FIGS. 1-3 a vehicle 10 includes a sliding door assembly 12 which in turn comprises a door assembly 13 which is supported in a door frame structure via a slide support assembly 14.

The support assembly 14 has a longitudinally extending channel member 16 which has an upper, generally flat leg portion 18 which is fixed to an upper portion 20 of the door frame structure. The structure portion 20 extends longitudinally generally coextensively with the flat leg portion 18. Spaced from the leg portion 18 is a second leg portion 22 which also extends generally parallely and coextensively with the flat leg portion 18. THe leg portion 22 has a curved seat portion 24 which is of a generally circular contour for a purpose to be described.

THe door assembly 13 has an upper, longitudinally extending channel structure 26. The support assembly 14 has a second channel member 28 which has a cross section similar to channel member 16. The channel member 28 has a lower, generally flat leg portion 30 which extends coextensively with and is secured to the door channel structure 26. Spaced from leg portion 30 is a second leg portion 32, which has a curved seat portion 34, similar to seat 24 on leg portion 22.

In assembly, the channels 16 and 28 are interengaged with the curved portions 24 and 34 in confrontation with each other and with a strip, (or assembly 36 located in between.

The assembly 36 includes a plurality of ball members 38 located in openings 40 in a flat, strip retainer 42. The openings 40 are formed with a first pair of radially opposite tabs 44 and a second pair of radially opposite tabs 46. The tabs 44 extend downwardly while tabs 46 extend upwardly whereby each ball member 38 is held to the retainer 36 within its respective opening 40. The diameters of the confronting circular portions 24 and 34 of leg portions 22 and 32 are similar to that of the ball members 38 (or slightly smaller to assure good bearing contact).

With the structure as shown and described the ball bearing support minimizes friction for sliding the door 13 and in addition provides a relatively inexpensive durable construction.

While it will be apparent that the preferred embodiments of the invention disclosed are well calculated to fulfill the objects above stated, it will be appreciated that the invention is susceptible to modification, variation and change without departing form the proper scope or fair meaning of the invention.

What is claimed is:

1. In an automotive vehicle a sliding door assembly comprising: a door member, first means defining a doorway in the vehicle, sad first means including a longitudinally extending side channel at the top of said doorway with said side channel including a generally right angle section member, support means connected to said first means and said door member for slidably supporting said door member, said support means comprising a first channel member supported on said first means and a second channel member supported on said door member, said first channel member having a C-shaped cross section with a pair of legs and a connecting section and having one leg and said connecting section matingly located within said right angle section member, and a strip ball bearing assembly located between confronting surfaces on said first and second channel members.

2. The assembly of claim 1 with said confronting surfaces each being of a generally circular contour.

3. The assembly of claim 2 with said first and second channel members having similar C-shaped cross sections.

4. The assembly of claim 3 with said bearing assembly comprising a flat retainer member having a plurality of openings for receiving a plurality of ball members, each said opening having at least two oppositely located and axially oppositely extending tabs for retaining a ball member within the associated opening.

5. The assembly of claim 4 with each said opening having two pairs of said tabs.

6. The assembly of claim 1 with said bearing assembly comprising a flat retainer member having a plurality of openings for receiving a plurality of ball members, each said opening having at least two oppositely located and axially oppositely extending tabs for retaining a ball member within the associated opening.

7. The assembly of claim 6 with each said opening having two pairs of said tabs.